US010653948B2

(12) United States Patent
Goslin et al.

(10) Patent No.: US 10,653,948 B2
(45) Date of Patent: May 19, 2020

(54) CALIBRATION OF A MAGNETOMETER FOR AUGMENTED REALITY EXPERIENCE (71) Applicant: Disney Enterprises, Inc., Burbank, CA (US)

(72) Inventors: Michael P. Goslin, Sherman Oaks, CA (US); Matthew W. Ryan, Aliso Viejo, CA (US); Elliott H. Baumbach, Porter Ranch, CA (US); John Crocker, Valencia, CA (US); Lee Chidgey, Simi Valley, CA (US); Timothy M. Panec, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 240 days.

(21) Appl. No.: 15/794,792

(22) Filed: Oct. 26, 2017

(65) Prior Publication Data
US 2019/0126139 A1 May 2, 2019

(51) Int. Cl.
A63F 13/22 (2014.01)
A63F 13/211 (2014.01)
A63F 13/80 (2014.01)
G06T 19/00 (2011.01)
A63F 13/655 (2014.01)
A63F 13/533 (2014.01)
A63F 13/428 (2014.01)

(52) U.S. Cl.
CPC ............ A63F 13/22 (2014.09); A63F 13/211 (2014.09); A63F 13/428 (2014.09); A63F 13/533 (2014.09); A63F 13/655 (2014.09); A63F 13/80 (2014.09); G06T 19/006 (2013.01); A63F 2300/8082 (2013.01)

(58) Field of Classification Search
None
See application file for complete search history.

(56) References Cited

U.S. PATENT DOCUMENTS 8,851,996 B2 10/2014 Russo
2012/0065917 A1* 3/2012 Takahashi ............. G06F 3/0346 702/104
2013/0072297 A1* 3/2013 Seegers ................... A63F 13/06 463/31
2013/0320966 A1* 12/2013 Oliver ................ G01R 33/0035 324/202

(Continued)

Primary Examiner — Jason T Yen
(74) Attorney, Agent, or Firm — Patterson+Sheridan, LLP (57) ABSTRACT Systems, methods and articles of manufacture relating to calibration of a magnetometer in an electronic device suitable for use in an augmented reality (AR) and/or virtual reality (VR) video game. An electronic video game device includes a magnetometer. A prompt is displayed in the video game requesting a user-performed first gameplay motion using the electronic video game device where the first gameplay motion is a pre-defined motion used for calibrating the magnetometer. A first plurality of measurements is received from the magnetometer relating to a magnetic field in a physical gameplay environment, where the first plurality of measurements is taken by the magnetometer during the first gameplay motion. The first plurality of measurements is analyzed to detect a magnetic bias in the magnetometer. The magnetometer is calibrated to offset the magnetic bias.

17 Claims, 7 Drawing Sheets (56) References Cited

U.S. PATENT DOCUMENTS

| | | | |
|---|---|---|---|
| 2014/0278190 A1* | 9/2014 | Brist | G01R 33/0035 |
| | | | 702/104 |
| 2014/0361763 A1* | 12/2014 | Chow | G01C 17/38 |
| | | | 324/202 |
| 2016/0331304 A1* | 11/2016 | Libey | A61B 5/486 |
| 2016/0349509 A1* | 12/2016 | Lanier | G02B 27/0172 |
| 2019/0018487 A1* | 1/2019 | Tsurumi | G06F 3/002 |

* cited by examiner

CALIBRATION OF A MAGNETOMETER FOR AUGMENTED REALITY EXPERIENCE

BACKGROUND

Field of the Invention

The present disclosure generally relates to calibration of a magnetometer in an electronic device suitable for use in an augmented reality (AR) and/or virtual reality (VR) system.

Description of the Related Art

Computer graphics technology has significantly progressed since the first video games were developed. Relatively inexpensive 3D graphics engines now provide nearly photo-realistic interactive gameplay on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Some devices may allow users to manipulate the virtual objects being displayed by, for example, moving the device or manipulating a joystick or buttons. This is commonly referred to as an augmented reality (AR) or virtual reality (VR) video game.

SUMMARY

Embodiments described herein include a method, a system, and computer program product for calibrating a magnetometer in an electronic video game device. The method, system, and computer program product display a prompt in a video game requesting a user-performed first gameplay motion using the electronic video game device, the first gameplay motion being a pre-defined motion used for calibrating the magnetometer. The method, system, and computer program product receive a first plurality of measurements from the magnetometer relating to a magnetic field in a physical gameplay environment, the first plurality of measurements being taken by the magnetometer during the first gameplay motion. The method, system, and computer program product analyze the first plurality of measurements to detect a magnetic bias in the magnetometer. The method, system, and computer program product calibrate the magnetometer to offset the magnetic bias

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments herein describe calibrating a magnetometer in an electronic device suitable for use in an AR/VR system—e.g., a video game. As described above, AR/VR video games can involve the insertion of virtual objects into captured images of a physical, real world scene. The combination of virtual and real world objects can then be displayed to a user. And the user can manipulate the virtual objects through the use of an electronic game controller device.

To facilitate accurate display and manipulation of the virtual objects, devices used in the AR/VR video game system can include a magnetometer. A magnetometer detects properties of the earth's magnetic field in the user's physical, real-world location. Before use, the magnetometer may be calibrated for the user's particular physical environment. In one embodiment, performing calibration offsets biases in the magnetometer's measurements relating to the magnetic field. Calibration creates an effectively neutral magnetic environment, allowing the magnetometer to provide more accurate results.

Calibration can involve moving the magnetometer in many different directions. For example, the user could be asked to stand in the center of the physical environment and move the magnetometer in a series of directions to approximate forming a spherical shape with the magnetometer's movement. The magnetometer takes sample measurements as it is moved. Based on these measurements, any biases in the magnetometer's measurements can be detected and the magnetometer can be calibrated to offset these biases.

But when a magnetometer is used in a component of an AR/VR video game system, calibration of the magnetometer can distract from the user's gameplay experience. Incorporating calibration into the user's gameplay experience can avoid this distraction. Further, it has been discovered that the magnetometer need not be moved in every direction necessary to approximate a spherical shape. Instead, more restricted movements can be sufficient to calibrate the magnetometer for gameplay.

In one embodiment, a magnetometer in an electronic device in an AR/VR video game system is calibrated through a series of gameplay movements. These gameplay movements can occur, for example, in a training phase prior to normal gameplay. In another embodiment, the magnetometer is calibrated through movements occurring during normal gameplay.

As discussed above, it has been discovered that the magnetometer need not be moved in every direction necessary to approximate a sphere from its movements. Instead, the magnetometer need only be moved sufficiently so that measurements taken during its movement reach a calibration threshold. The amount of calibration required depends, in part, on the user's physical environment. For example, magnetic biases in the magnetometer can result from biases inherent in the magnetometer itself, like manufacturing defects. But magnetic biases can also result from magnetic interference in the user's physical location. Calibration can compensate for both types of biases.

To ensure that calibration is sufficient for all, or nearly all, users, the calibration threshold can be pre-defined and set to a relatively high value. But this can result in wasted movement and time for the user if the user is in a physical environment requiring less calibration or if the magnetometer includes less inherent bias than a typical magnetometer. Instead, the calibration threshold can be determined dynamically based on a comparison of measurements taken from the magnetometer with a standard model. This dynamically determined calibration threshold can be used to determine when the magnetometer has been sufficiently calibrated.

Figure 1:
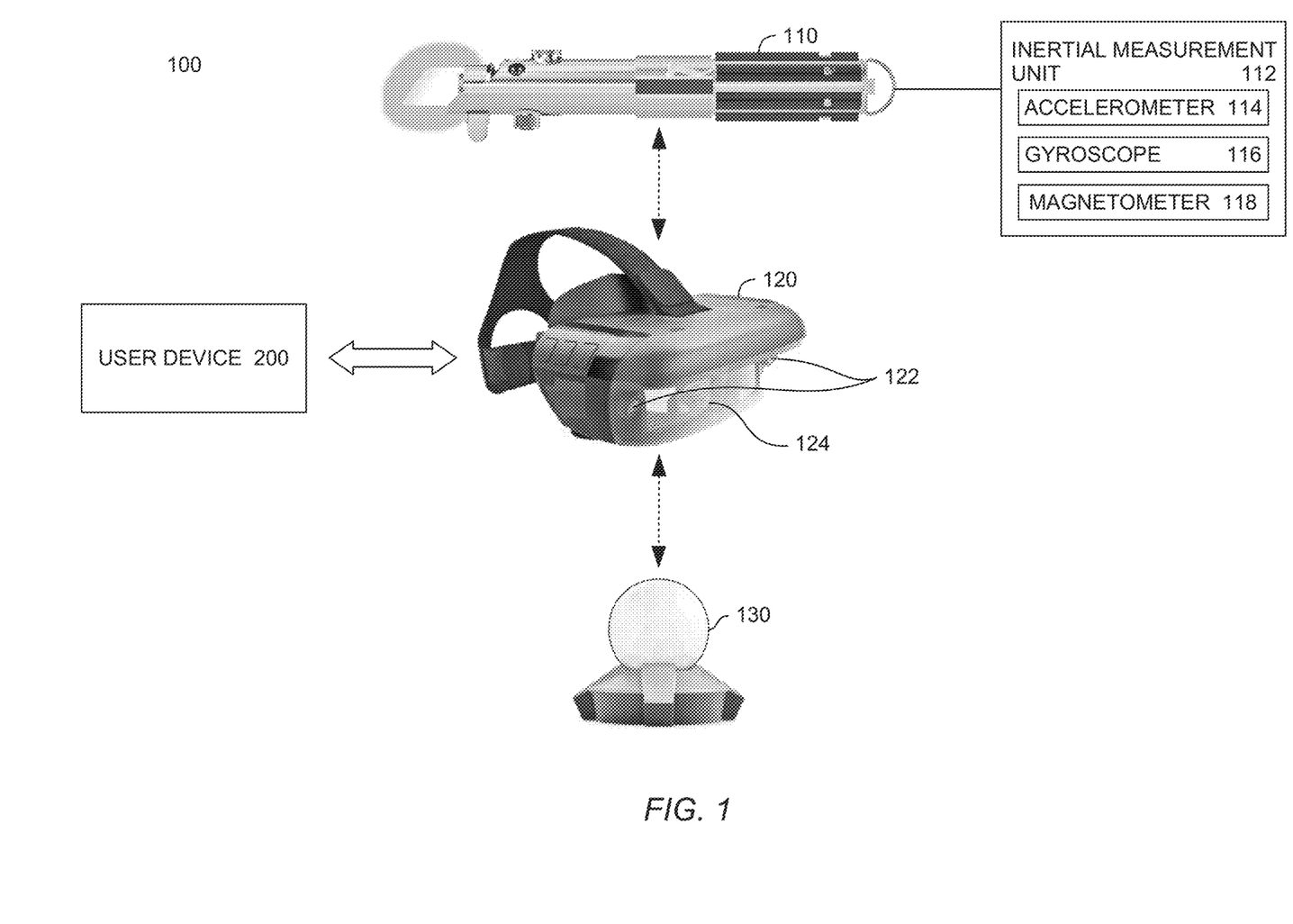
FIG. 1 illustrates an exemplary interactive environment.

FIG. 1 illustrates an exemplary interactive environment, according to one embodiment. In the example embodiment illustrated in FIG. 1, the interactive environment is an AR/VR video game. Within a system 100, a headset 120 communicates with a user device 200. This communication can be done wirelessly, through Bluetooth® communications or any other suitable method. Further, the headset 120 can be connected to the user device 200 directly, or through a wired connection. The headset 120 can be a headset to be worn by the user, or may be any device including a visual display of any suitable type. For example, the headset 120 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

In some embodiments, the headset 120 is separate from the user device 200 but is configured to superimpose virtual imagery onto physical objects in the user's field of view. For example, as illustrated in FIG. 1 the headset 120 may be a body-worn device. The headset 120 further includes a holder 124 for a user device 200. For example, the user device 200 can be a portable device like a smartphone or tablet. The user device 200 can be inserted into the holder 124 in the headset 120 during gameplay. The user device 200 is described in more detail with respect to FIG. 2. The headset 120 may also be configured as an eyepiece or lens worn in front of the user's eye. In another example, the headset 120 may be integrated into other devices that are carried or handled by the user, or having any other suitable user interaction during the game playing experience. For example, while participating in the game play, the user can carry a toy blaster that includes an optical sight for aiming, and the headset 120 may be integrated in the optical sight.

The headset 120 includes the visual sensors 122. The visual sensors 122 can include cameras configured to sense visible light and/or infrared light. The visual sensors 122 can be configured to capture images of a user's real-world, physical environment. The visual sensors 122 can be connected to the user device 200, through any suitable wired or wireless connection.

In one embodiment, the headset 120 includes audio output devices. The audio output devices may include conventional audio speakers having any suitable form factor (e.g., stand-alone, integrated in a stereo, headphones, etc.), as well as devices using alternative methods of producing sound perceptible by a user, such as bone conduction transducers in a body-worn device. In some embodiments, the audio output devices are included within the user device 200 (e.g., speakers of the smartphone, tablet device, etc.). In other embodiments, the audio output devices are separate from the user device 200.

In some embodiments, the user device 200 operates in an AR mode, generally configured to superimpose virtual images such as characters, objects, and/or dynamic visual effects into the user's natural field of view of the environment using a headset 120. The field of view of the user is generally determined using sensor devices such as the visual sensors 122. In some embodiments, the user device 200 is configured to operate in a VR mode, generally replacing the user's natural field of view of the environment with virtual imagery using the headset 120.

For example, the headset 120 may superimpose a virtual character to appear seated on a physical chair detected within the environment. The display of the virtual character on the headset 120 is dynamically adjusted based on the user's field of view (orientation), the determined depth of the chair from the user, and so forth. As another example, the headset 120 could superimpose a virtual blade extending from the hilt 110 held in the user's hand. In one embodiment, the virtual image can be generated by the user device 200 and displayed as a reflected image on the headset 120. The headset 120 can include reflective elements like mirrors, beam splitters, and the like to facilitate display of the reflected image. The headset 120 can also include lenses or other optical elements.

In some embodiments, the user device 200 is configured to dynamically select one of the AR mode and VR mode based on the sensed characteristics of the environment and/or based on the game play. For example, the visual sensors 122 may detect that the environment is extremely bright (e.g., when the user is in direct sunlight), which may be difficult for a user to view overlaid information using the headset 120. In another example, the gameplay may specify a night-time setting. In these examples, the VR mode may be enabled in order to substantially isolate the user's field of view from the surrounding physical environment and thereby reduce the amount of light received from the environment. In both cases, dynamic selection of the AR/VR display mode can improve the immersive nature of the gameplay environment, whether through ensuring the user is able to suitably view the overlaid information or through providing a more realistic setting consistent with the virtual setting of the game.

The headset 120 provides a compact AR/VR display that may be carried or worn by the user during the gameplay experience. As discussed above, the headset 120 may include devices that are separate from the display of the user device 200. Implementations of the compact AR/VR display that use a smartphone or other mobile computing device offer several advantages. For example, implementations able to adapt the user's smartphone provide a reduced manufacturing cost of the compact AR/VR display, as no separate computing hardware need be included. A camera included in the smartphone may be used as visual sensor 122 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing during game play. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

The system 100 further includes a tracking beacon 130. The tracking beacon 130 includes a light that can be used as a reference point by the user device 200 and/or the headset 120. The visual sensors 122 in the headset 120 can be used to track the light from the tracking beacon 130 in order to provide a reference point for the floor in the user's physical location. Further, the tracking beacon 130 can be in communication with the user device 200 and/or the headset 120 through a suitable wireless or wired communication protocol.

The system 100 further includes the hilt 110. In the AR/VR video game illustrated in FIG. 1, the hilt 110 acts as a game controller, simulating a sword or staff to the user. The hilt 110 can be in communication with a user device 200, a headset 120, and/or a tracking beacon 130. This communication can be done wirelessly through Bluetooth communications, via a wired connection, or through any other suitable method.

During gameplay, a virtual blade, sword, or staff extending from the hilt 110 is projected onto the display of the headset 120. To facilitate this, the hilt 110 includes a variety of sensors and buttons. For example, the hilt 110 can include physical buttons, touch sensors, or the like for user interaction. The hilt 110 also includes the inertial measurement unit 112. The inertial measurement unit 112 includes a nine degree of freedom sensor which may use information received from an accelerometer 114, a gyroscope 116, and a magnetometer 118. The inertial measurement unit 112 senses the orientation and movement of the hilt 110, to facilitate projection of the virtual blade on the headset 120. The accelerometer 114 measures acceleration forces stemming from movement of the hilt 110 in the user's physical environment. The gyroscope 116 measures orientation of the hilt 110 in the user's physical environment. The magnetometer 118 measures properties of a magnetic field in the user's physical environment.

For example, when the hilt 110 is used to simulate a sword or staff, the accelerometer 114 measures acceleration of the hilt 110 as the user swings the hilt 110. The user device 200 and the headset 120 can use these acceleration measurements from the accelerometer to display acceleration of the virtual blade projected on the headset 120 to the user. In this scenario, the gyroscope 116 measures the orientation of the hilt 110 in the user's physical environment. These orientation measurements can be used by the user device 200 and the headset 120 to display the orientation of the virtual blade on the headset 120. Over time, however, the gyroscope 116 may drift. This can cause the virtual blade extending from the hilt 110 and projected on the headset 120 to appear to the user to bend, or move. The magnetometer 118 can be used to correct this drift from the gyroscope. That is, the user device 200 and/or the headset 120 can use the magnetic field measurements from the magnetometer 118 to keep the virtual blade straight.

Figure 2:
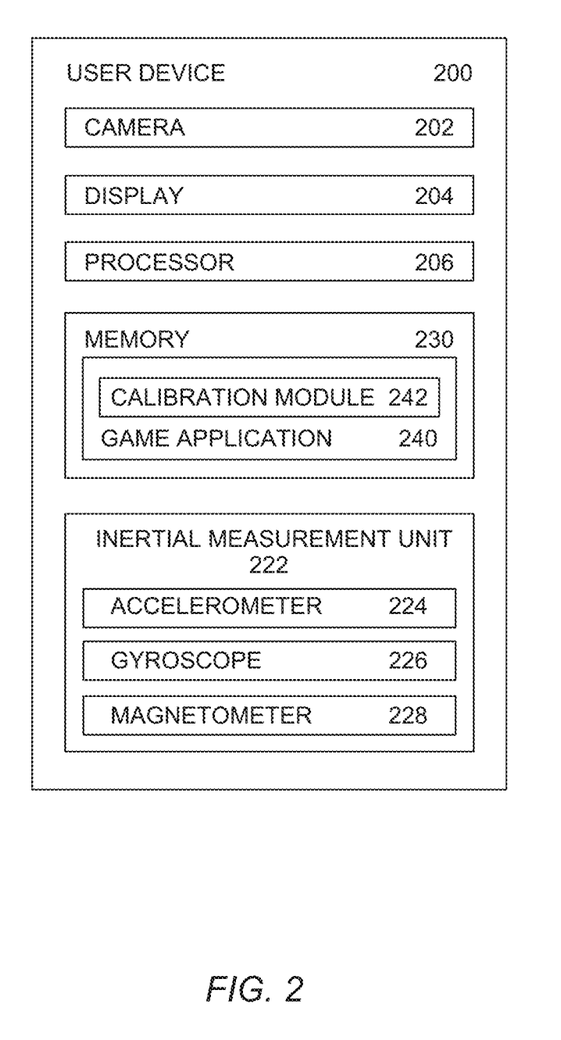
FIG. 2 illustrates a user device for use in an exemplary interactive environment.

FIG. 2 illustrates an exemplary user device 200, according to one embodiment. The user device 200 can be a smartphone, tablet, or any other suitable device. The user device 200 can be separate from the headset 120, or the user device 200 and the headset 120 can be integrated together to form a combined device. The user device 200 includes a camera 202. The camera 202 can be configured to sense visible light and/or infrared light. Alternatively, the camera 202 can be any other form of suitable visual sensor. The user device 200 further includes a display 204. The display 204 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

The user device 200 further includes a processor 206 which generally retrieves and executes programming instructions stored in the memory 230. The processor 206 is included to be representative of a single central processing unit (CPU), multiple CPUs, a single CPU having multiple processing cores, graphics processing units (GPUs) having multiple execution paths, and the like. The memory 230 is generally included to be representative of electronic storage of any suitable type(s), including random access memory or non-volatile storage.

The memory 230 generally includes program code for performing various functions related to game play. The program code is generally described as various functional "applications" or "modules" within the memory 230, although alternate implementations may have different functions and/or combinations of functions. Within the memory 230, the game application 240 is generally configured to control gameplay for the user. The game application 240 can include a variety of different gameplay phases or types. For example, the game application can include a training-phase that occurs prior to normal gameplay. During the training phase, the user is instructed on how to play the game and how to operate the devices. The game application can also include a normal gameplay mode that occurs after the training phase. Further the game application can include single player and multi-player game modes.

The game application 240 includes the calibration module 242 which controls calibration of the magnetometers 118 and 228, illustrated in FIGS. 1 and 2. As illustrated in FIG. 2, the game application 240 and the calibration module 242 are contained within the memory 230 of the user device 200.

Alternatively, the game application 240 and the calibration module 242 can be contained in memory within the hilt 110, the headset 120, or any other suitable location. Further, the calibration module 242 can be contained within the game application 240, or can be located separately.

The user device 200 includes an inertial measurement unit 222. As illustrated in FIG. 2, the inertial measurement unit 222 is separate from the inertial measurement unit 112 included in the hilt 110. For example, the inertial measurement unit 222 could be part of a smartphone, tablet, or other suitable device. The inertial measurement unit 222 includes an accelerometer 224 which measures acceleration forces stemming from movement of the user device 200 in the user's physical environment. The inertial measurement unit 222 can further include a gyroscope 226 that measures orientation of the user device 200 in the user's physical environment. The inertial measurement unit 212 can further include the magnetometer 228 which measures properties of a magnetic field in the user's physical environment.

Figure 3:
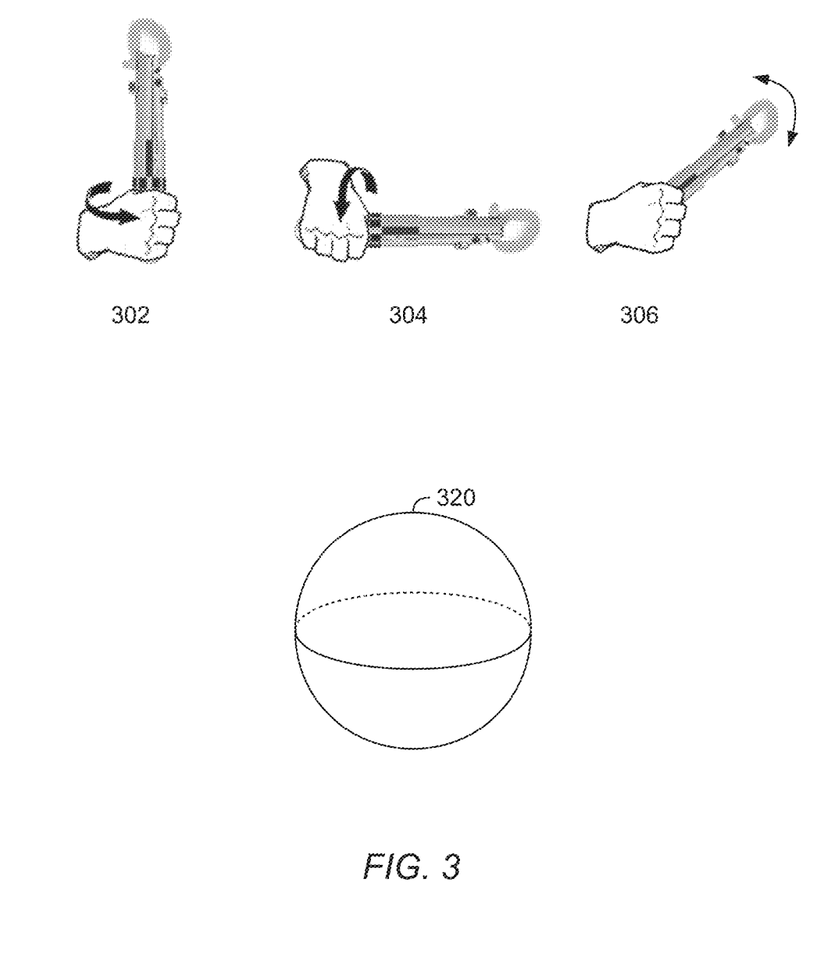
FIG. 3 illustrates aspects of calibration of a magnetometer in a device used as part of an exemplary interactive environment.

FIG. 3 illustrates calibration of a magnetometer in a device used as part of an interactive environment. As discussed above, the magnetometer 118 in the hilt 110 can be calibrated to correct for magnetic biases. These biases may be inherent in the magnetometer itself (like manufacturing defects), or may stem from magnetic interference in the user's physical environment. Thus, magnetic biases will vary from magnetometer to magnetometer and from location to location. For example, the hilt 110 may be manufactured in a large-scale factory environment. Such a factory environment may include a large number of metal beams or metal equipment, creating magnetic interference. A user, by contrast, may choose to play the game in a residential environment without metal beams or metal equipment. If the magnetometer 118 in the hilt 110 is initially configured in the factory environment, it may operate incorrectly in the user's residential environment. Further, the location on the earth's surface and the distance from the earth's surface can affect the accuracy of the magnetometer's measurements. For example, if a magnetometer is configured in Asia in a ground floor building, and then used in North America in a high-rise building, the magnetometer may operate incorrectly.

Calibrating the magnetometer 118 can compensate for these biases. Calibration can be done by moving the magnetometer in a generally spherical pattern. The magnetometer is rotated and twisted in many directions along different axes of orientation. This can be done by placing the device containing the magnetometer in a three-axis gimbal or another device facilitating movement in different directions. It can also be done through instructing the user to move the magnetometer in calibration specific ways. The user's movement of the hilt 110 would form a generally spherical shape, approximating a sphere 320 shown in FIG. 3. Sample measurements are taken as the magnetometer is moved, and these measurements are used to compensate for the magnetic biases.

In one embodiment, a user can be instructed, via the user device 200 and/or the headset 120, to move the hilt 110 in many directions for calibration. As discussed above, ideally the magnetometer would be calibrated using a three-axis gimbal or another device facilitating movement in every direction and every axis of orientation. This allows the calibration module 242 to compensate for as many different magnetic biases as possible. But use of a gimbal is impractical, and so a user can be instructed to move the magnetometer in calibration specific ways. Requiring a user to calibrate the magnetometer through a lengthy process of moving the magnetometer in calibration specific ways is still, however, burdensome and time consuming. Such a lengthy calibration process for the magnetometer can detract from gameplay and harm the user experience.

Instead, the calibration process for the magnetometer 118 can be shortened and integrating the calibration process into the game play. As discussed in more detail with reference to FIGS. 4-6, instead of a lengthy calibration process, gameplay movements can be used for calibrating the magnetometer 118. Incorporating calibration into gameplay improves the user experience, while still ensuring that the magnetometer 118 is sufficiently calibrated.

Diagrams 302, 304, and 306 illustrate example movements for calibrating the magnetometer 118 in the hilt 110 that could be incorporated into gameplay. For example, as shown in diagram 302, the hilt 110 can be held vertically and twisted in a clockwise or counter-clockwise direction. Measurements can be taken during this motion and used for calibration. As shown in diagram 304, the hilt 110 can also be held horizontally and twisted in a clockwise or counter-clockwise direction. Further, as shown in diagram 306, the hilt 110 can be swung diagonally. Prior to being swung, the hilt 110 can start out in a vertical orientation, in a horizontal orientation, in a diagonal orientation, or in any other suitable orientation. Measurements can be taken during any, or all, of these movements and used for calibration. Diagrams 302, 304, and 306 are merely illustrative examples—any other suitable gameplay movement could be used for calibration of the magnetometer 318.

Figure 4:
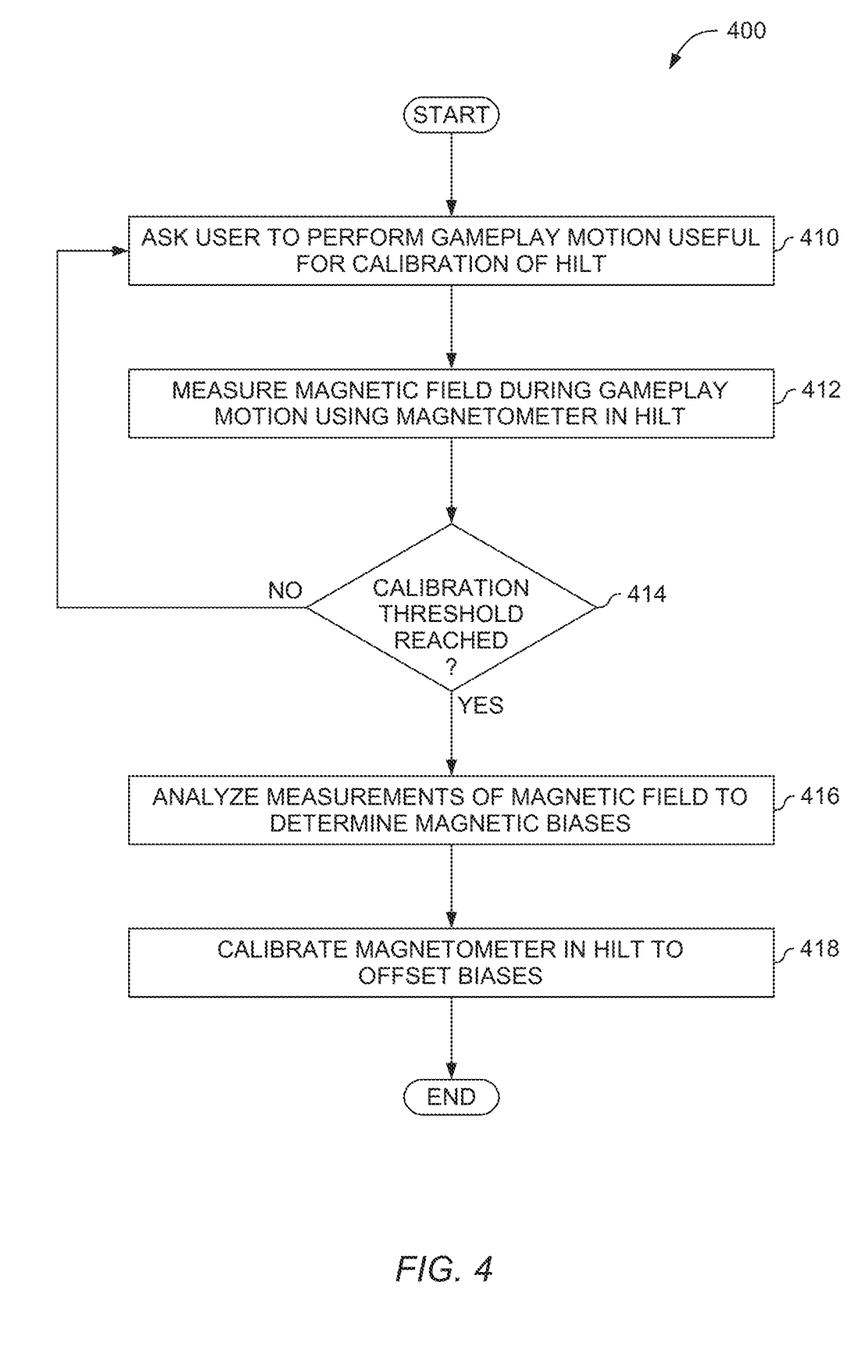
FIGS. 4-6 are flowcharts for calibrating a magnetometer in a game controller device used as part of an exemplary interactive environment.

FIG. 4 is a flowchart for calibrating a magnetometer in a game controller device used as part of an interactive environment. The illustrations in FIGS. 4-7 relate, again, to an exemplary AR/VR video game. But the illustrated steps can be applied to any suitable video game or other interactive environment.

At step 410, a game application (e.g., the game application 240) provides a request to a user asking the user to perform a gameplay motion useful for calibration of a magnetometer (e.g., the magnetometer 118 in the hilt 110). For example, the game application for the exemplary AR/VR video game could include a Kendo Kata pattern as part of a gameplay phase intended to train the user on use of a blade, sword, or staff. A Kendo Kata is a pattern intended to teach a Kendo practitioner the basic elements of swordsmanship. In this example, the movements in the Kendo Kata are chosen to facilitate calibration of the magnetometer 118 by, for example, encouraging the user to move the hilt 110 in ways useful for calibration—e.g., the motions corresponding to the diagrams 302, 304, and 306 shown in FIG. 3. As another example, the training phase, or a normal gameplay phase, could include specifically chosen gameplay elements, like combat with non-player characters, striking virtual objects, blocking or parrying projectiles, etc. The movements required to succeed in these gameplay elements could be chosen to facilitate calibration by, for example, encouraging the user to move the magnetometer in a particular way. The gameplay movements, incorporated into the Kendo Kata or other aspects of game play, facilitate calibration without alerting the user that calibration is occurring and without interrupting game play. Thus, calibration of the magnetometer 118 can be combined with training the user on use of the blade or other gameplay elements, improving the gameplay experience while ensuring that any necessary calibration occurs.

At step 410, the game application asks the user to perform the gameplay motion, for example the first movement of the Kata. At step 412, the magnetometer measures the magnetic field during the movement. These measurements are transmitted to a calibration module in the game application (e.g., the calibration module 242). The calibration module includes a calibration threshold. The calibration threshold is used to determine whether the magnetometer has been sufficiently calibrated. As discussed above, the goal of calibration can be to move the magnetometer in many different directions to form a generally spherical shape. But it has been discovered that calibration with less movement may be sufficient. For example, the calibration threshold could be set to 60%. In this scenario, when the user has moved the magnetometer sufficiently to cover 60% of the movement necessary to form the ideal the spherical shape, the calibration threshold has been reached.

At step 414, the calibration module determines whether the calibration threshold has been reached following the latest movement of the magnetometer. If the threshold has not been reached, the game application returns to step 410 and asks the user to perform another gameplay motion useful for calibration. For example, the game application 240 could ask the user to perform the next movement in the Kata pattern using the hilt 110 or to perform a different Kata.

Returning to step 414, if the calibration threshold has been reached, the game application proceeds to step 416 where the calibration module analyzes the measurements obtained by the magnetometer during the user's movements of the magnetometer, and uses those measurements to determine the magnetic biases of the magnetometer. At step 418, the calibration module calibrates the magnetometer to offset these biases.

In some embodiments, calibration is undertaken fully using gameplay motions. For example, the Kendo Kata pattern may be sufficient to calibrate the magnetometer 118. In other embodiments, gameplay motions can be combined with direct calibration motions to ensure the magnetometer is sufficiently calibrated. For example, in addition to the Kendo Kata pattern, the user could be instructed to roll or twist the hilt 110 to finalize calibration of the magnetometer 118. That is, some motions used to calibrate the magnetometer may not integrate well (or at all) with gameplay in which case the gaming application may specifically ask the user to perform the motion.

Figure 5:
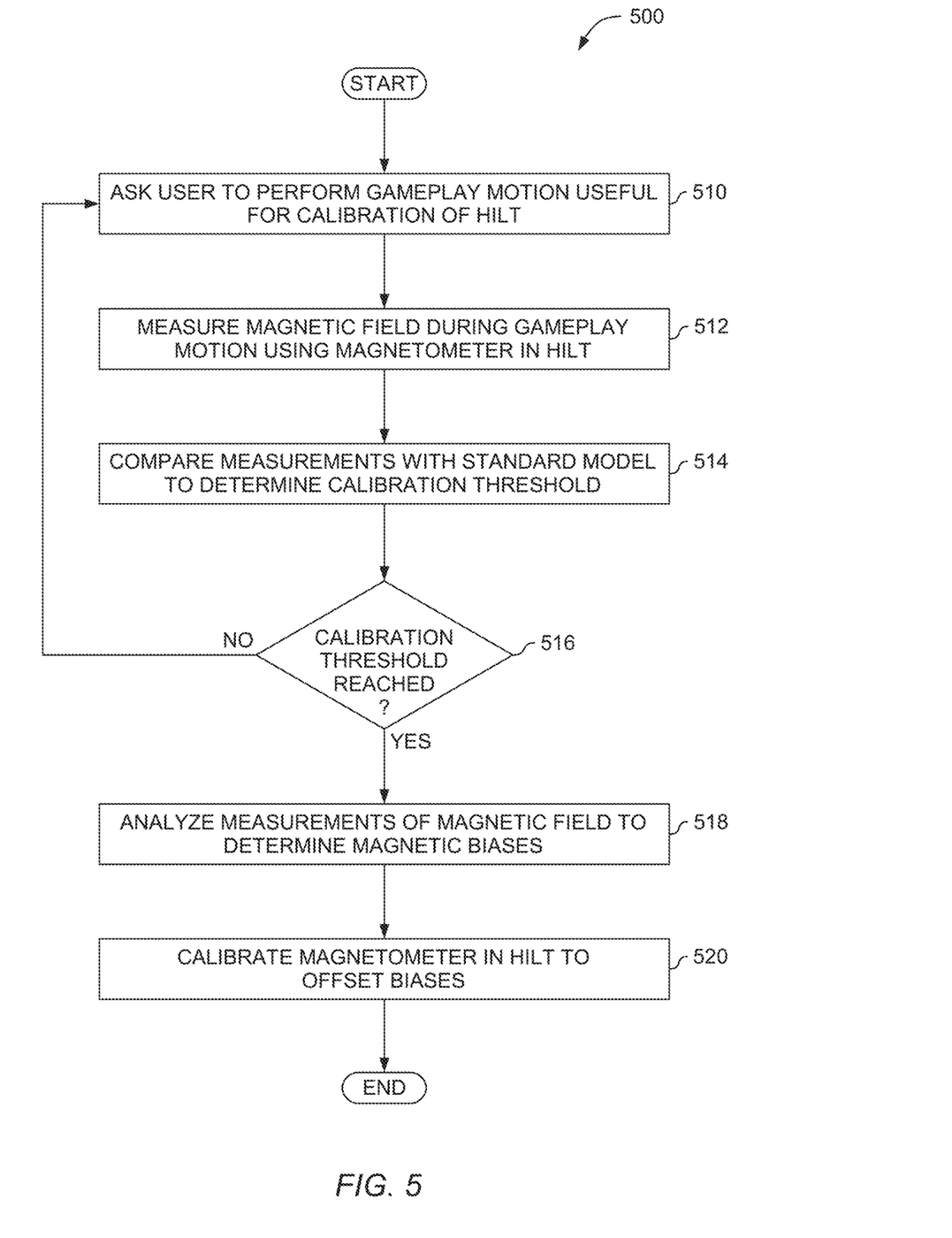

FIG. 5 is a flowchart for calibrating a magnetometer in a device used as part of an interactive environment. Step 510 can be similar to step 410 in FIG. 4, described above, and will not be described in detail here. At step 512, like step 412 in FIG. 4, the magnetometer measures the magnetic field during the movement. These measurements are transmitted to a calibration module in the game application (e.g., the calibration module 242). The calibration module includes a calibration threshold. The calibration threshold is used to determine whether the magnetometer has been sufficiently calibrated. In the embodiment illustrated in FIG. 4, discussed above, this calibration threshold was pre-determined. The calibration threshold is chosen to ensure that the magnetometer is calibrated sufficiently for all, or nearly all, users. But this can be wasteful for users in environments that require less calibration. For example, a user in a high rise building with a metal frame will likely require more calibration of the magnetometer than a user in a first floor building with a wooden frame. A pre-determined calibration threshold will result in either too little calibration for the high-rise user, impacting the accuracy of the magnetometer, or too much calibration for the wooden-frame user, wasting time and harming the gameplay experience. Instead, the calibration threshold can be set dynamically for each user.

At step 514, the calibration module compares the measurements received during the gameplay motion with a standard model of expected measurements and thresholds. A standard model can be a pre-defined model of expected measurements for an average location. For example, the standard model could relate to expected measurements from a first floor location in a wooden framed building. The measurements from the magnetometer can be compared with the values in the standard model to indicate how much calibration of the magnetometer is necessary. The standard model can include desired values for a number of measurements, ranges of values for the measurements, threshold values for the measurements, or any other values suitable to compare with measured values from the magnetometer and determine how much calibration is needed.

If the received measurements differ greatly from the standard model, the calibration threshold is set relatively high. If the received measurements differ only slightly from the standard model, the calibration threshold is set relatively low. This dynamic calibration threshold further improves the gameplay experience while still ensuring the magnetometer is calibrated sufficiently. In some embodiments, step 514 need only be undertaken once to determine the calibration threshold. In other embodiments, step 514 can be undertaken repeatedly to refine the calibration threshold.

At step 516, the calibration module determines whether the dynamically determined calibration threshold has been reached following the latest movement of the magnetometer. If the threshold has not been reached, the game application returns to step 510 and asks the user to perform another gameplay motion useful for calibration. For example, the game application 240 could ask the user to perform the next movement in the Kata pattern by moving the hilt 110. Returning to step 516, if the calibration threshold has been reached, the game application proceeds to step 518. At step 518, the calibration module analyzes the measurements obtained by the magnetometer during the user's movements of the magnetometer, and uses those measurements to determine the magnetic biases of the magnetometer. At step 520, the calibration module calibrates the magnetometer to offset these biases.

As illustrated in FIGS. 4 and 5, in some embodiments calibration of the magnetometer can occur during a special gameplay phase, for example a sword training phase in a combat themed AR/VR video game. Additionally, calibration can occur during normal gameplay. Generally, this ongoing calibration is during normal gameplay is less intrusive on gameplay, but because it does not rely on gameplay motions chosen to maximize movement of the magnetometer in directions useful for calibration, the calibration may not be as effective. But ongoing calibration may be sufficient if, for example, the magnetometer has been initially calibrated but the user moves from one location to another with different magnetic properties. Further, the magnetometer may need additional minor calibration over time, and calibration during normal gameplay may be sufficient. And in some cases, the magnetometer may be sufficiently calibrated at the factory that only minimal calibration is necessary, making calibration during normal gameplay sufficient.

Figure 6:
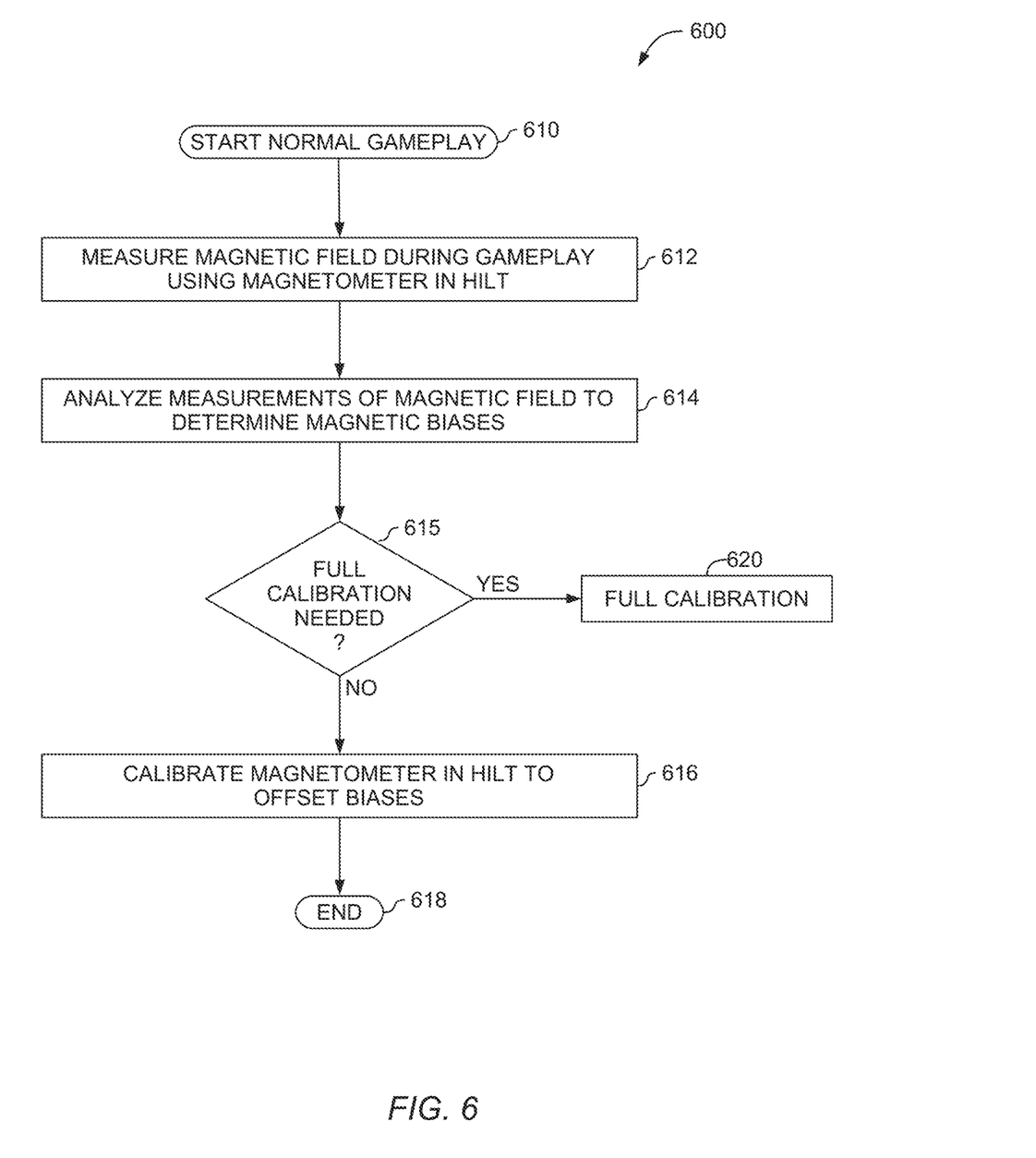

Ongoing calibration, as illustrated in FIG. 6, can be triggered in several different ways. For example, the game application could be configured to constantly calibrate while the user is playing the game. Alternatively, the game application could be configured to trigger ongoing calibration at pre-defined intervals (e.g., weekly, monthly, etc.). Further, the game application could be configured to take sample measurements from the magnetometer and compare those sample measurements to a standard model. If the measurements are sufficiently different from the expected values according to the standard model, calibration could be triggered. Further, the game application could determine, based on the measurements, whether to trigger ongoing calibration or request the user undertake full calibration.

At step 610, the user begins normal gameplay using the game application (e.g., the game application 240). At step 612, the magnetometer (e.g., the magnetometer 118) measures the magnetic field during game play. At step 614, the calibration module (e.g., the calibration module 242) analyzes the measurements from the magnetometer to determine magnetic biases. In one embodiment, at step 615 the calibration module uses these measurements to determine whether full calibration is needed. If full calibration is needed, the calibration module proceeds to step 620 and undertakes full calibration. For example, the user could be asked to return to the training mode with the Kendo Kata pattern chosen for calibration. If full calibration is not needed, the calibration module proceeds to step 616. Alternatively, the calibration module can function without step 615 and can proceed from step 614 to step 616. At step 618, the calibration module calibrates the magnetometer to offset the magnetic biases.

Figure 7:
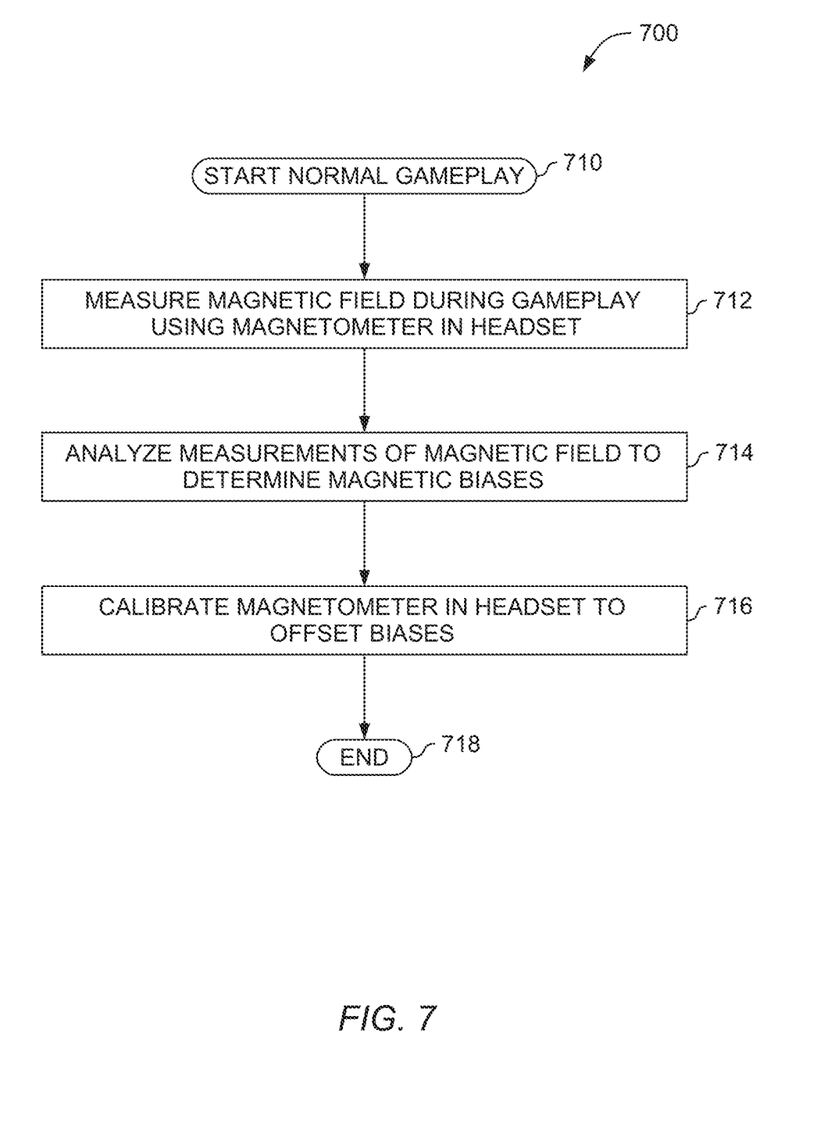
FIG. 7 is a flowchart for calibrating a magnetometer in a headset used as part of an exemplary interactive environment.

FIG. 7 is a flowchart for calibrating a magnetometer in a headset used as part of an interactive environment. As discussed above with reference to FIGS. 1 and 2, the system 100 includes two magnetometers: the magnetometer 118 in the hilt 110 and the magnetometer 228 in the user device 200. FIGS. 4-6 illustrate calibrating the magnetometer 118. But the magnetometer 228 may also need calibration. As discussed with reference to FIG. 2, the user device 200 (with the magnetometer 228) can be inserted into the headset 120. Alternatively, the user device 200 and the headset 120 can be integrated into a single device. In both embodiments, the headset 120 can be worn on the user's head. Consequently, it is generally not desirable to calibrate the magnetometer 228 by asking the user to perform specific head movements. Instead, the magnetometer 228 can be calibrated through normal game play.

At step 710, the user begins normal gameplay using a game application (e.g., the game application 240). As discussed above, a game application can include a variety of different phases, including a training phase and a normal gameplay phase. At step 712, a magnetometer in the headset or user device (e.g., the magnetometer 228) measures the magnetic field during game play. At step 714, a calibration module (e.g., the calibration module 242) analyzes these measurements to determine magnetic biases in the second magnetometer. At step 716, the calibration module calibrates the second magnetometer to offset these biases.

Just as described with reference to FIG. 6 for the magnetometer 118, ongoing calibration for the magnetometer 228 can be triggered in several different ways. For example, the game application could be configured to constantly calibrate while the user is playing the game. Alternatively, the game application could be configured to trigger ongoing calibration at pre-defined intervals (e.g., weekly, monthly, etc.). Further, the game application could be configured to take sample measurements from the magnetometer and compare those sample measurements to a standard model. If the measurements are sufficiently different from the expected values according to the standard model, calibration could be triggered.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the game application 240 or related data available in the cloud. For example, the game application 240 could execute on a computing system in the cloud. In such a case, the game application 240 and the calibration module 242 could control gameplay and calibration of the magnetometer, and store related data, at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for calibrating a magnetometer in an electronic video game device, the method comprising:
    displaying a prompt in a video game requesting a user-performed first gameplay motion using the electronic video game device, wherein the user-performed first gameplay motion is a pre-defined motion used for calibrating the magnetometer;
    receiving a first plurality of measurements from the magnetometer relating to a magnetic field in a physical gameplay environment, wherein the first plurality of measurements is taken by the magnetometer during the user-performed first gameplay motion;
    analyzing the first plurality of measurements using a calibration threshold to detect a magnetic bias in the magnetometer;
    changing the calibration threshold based on a comparison of the first plurality of measurements to a standard model, wherein increasing the calibration threshold increases an amount of required calibration of the magnetometer and decreasing the calibration threshold decreases an amount of required calibration of the magnetometer; and
    calibrating the magnetometer to offset the magnetic bias.

2. The method of claim 1, wherein display of the prompt occurs during a training phase of the video game and wherein the user-performed first gameplay motion involves interacting with a virtual object or character in the video game.

3. The method of claim 2, wherein the user-performed first gameplay motion is at least one of: a motion in a Kata pattern, a motion to block a projectile, or a motion to strike a virtual object or character.

4. The method of claim 1, further comprising:
determining, based on the first plurality of measurements and the calibration threshold, that additional calibration of the magnetometer is needed;
displaying a second prompt in the video game requesting a user-performed second gameplay motion using the video game device;
receiving a second plurality of measurements from the magnetometer relating to the physical gameplay environment, wherein the second plurality measurements are taken by the magnetometer during the user-performed second gameplay motion of the video game device; and
analyzing the second plurality of measurements to detect a second magnetic bias in the magnetometer, wherein calibrating the magnetometer offsets both the magnetic bias and the second magnetic bias.

5. The method of claim 4, wherein both the user-performed first gameplay motion and the user-performed second gameplay motion of the video game device occur during a training phase of the video game.

6. The method of claim 4, wherein the user-performed first gameplay motion occurs during normal gameplay, outside of a training phase, the method further comprising:
displaying a prompt requesting entry to the training phase, based on determining that additional calibration of the magnetometer is needed.

7. The method of claim 1, further comprising:
receiving a second plurality of measurements from a second magnetometer in a user device, wherein the user device is configured to removably attach to an augmented reality headset, wherein the second plurality of measurements relate to the physical gameplay environment;
analyzing the second plurality of measurements to detect a second magnetic bias in the second magnetometer; and
calibrating the second magnetometer, using the second plurality of measurements, to offset the second magnetic bias.

8. A computer program product for calibrating a magnetometer in an electronic video game device, the computer program product comprising:
a non-transitory computer-readable storage medium having computer-readable program code embodied therewith, wherein the code, when executed by a processor, performs an operation, the operation comprising:
displaying a prompt in a video game requesting a user-performed first gameplay motion using the electronic video game device, wherein the user-performed first gameplay motion is a pre-defined motion used for calibrating the magnetometer;
receiving a first plurality of measurements from the magnetometer relating to a magnetic field in a physical gameplay environment, wherein the first plurality of measurements is taken by the magnetometer during the user-performed first gameplay motion;
analyzing the first plurality of measurements using a calibration threshold to detect a magnetic bias in the magnetometer;
changing the calibration threshold based on a comparison of the first plurality of measurements to a standard model, wherein increasing the calibration threshold increases an amount of required calibration of the magnetometer and decreasing the calibration threshold decreases an amount of required calibration of the magnetometer; and
calibrating the magnetometer to offset the magnetic bias.

9. The computer program product of claim 8, wherein display of the prompt occurs during a training phase of the video game and wherein the user-performed first gameplay motion involves interacting with a virtual object or character in the video game.

10. The computer program product of claim 8, the operation further comprising:
determining, based on the first plurality of measurements and the calibration threshold, that additional calibration of the magnetometer is needed;
displaying a second prompt in the video game requesting a user-performed second gameplay motion using the video game device;
receiving a second plurality of measurements from the magnetometer relating to the physical gameplay environment, wherein the second plurality measurements are taken by the magnetometer during the user-performed second gameplay motion of the video game device; and
analyzing the second plurality of measurements to detect a second magnetic bias in the magnetometer, wherein calibrating the magnetometer offsets both the magnetic bias and the second magnetic bias.

11. The computer program product of claim 10, wherein both the user-performed first gameplay motion and the user-performed second gameplay motion of the video game device occur during a training phase of the video game.

12. The computer program product of claim 10, wherein the user-performed first gameplay motion occurs during normal gameplay, outside of a training phase, the operation further comprising:
displaying a prompt requesting entry to the training phase, based on determining that additional calibration of the magnetometer is needed.

13. A system, comprising:
an electronic video game device, comprising:
a magnetometer;
a mobile device comprising:
a processor; and
a memory storing a program, which, when executed on the processor, performs an operation, the operation comprising:
displaying a prompt in a video game requesting a user-performed first gameplay motion using the electronic video game device, wherein the user-performed first gameplay motion is a pre-defined motion used for calibrating the magnetometer;
receiving a first plurality of measurements from the magnetometer relating to a magnetic field in a physical gameplay environment, wherein the first plurality of measurements is taken by the magnetometer during the user-performed first gameplay motion;
analyzing the first plurality of measurements using a calibration threshold to detect a magnetic bias in the magnetometer;
changing the calibration threshold based on a comparison of the first plurality of measurements to a standard model, wherein increasing the calibration threshold increases an amount of required calibration of the magnetometer and decreasing the calibration threshold decreases an amount of required calibration of the magnetometer; and calibrating the magnetometer to offset the magnetic bias.

14. The system of claim 13, wherein display of the prompt occurs during a training phase of the video game and wherein the user-performed first gameplay motion involves interacting with a virtual object or character in the video game.

15. The system of claim 14, wherein the user-performed first gameplay motion is at least one of: a motion in a Kata pattern, a motion to block a projectile, or a motion to strike a virtual object or character.

16. The system of claim 13, the operation further comprising:

determining, based on the first plurality of measurements and the calibration threshold, that additional calibration of the magnetometer is needed;

displaying a second prompt in the video game requesting a user-performed second gameplay motion using the video game device;

receiving a second plurality of measurements from the magnetometer relating to the physical gameplay environment, wherein the second plurality measurements are taken by the magnetometer during the user-performed second gameplay motion of the video game device; and analyzing the second plurality of measurements to detect a second magnetic bias in the magnetometer, wherein calibrating the magnetometer offsets both the magnetic bias and the second magnetic bias.

17. The system of claim 16, wherein both the user-performed first gameplay motion and the user-performed second gameplay motion of the video game device occur during a training phase of the video game.

* * * * *